(12) United States Patent
Hellberg et al.

(10) Patent No.: US 8,036,776 B2
(45) Date of Patent: Oct. 11, 2011

(54) METHOD AND DEVICE FOR CONTROLLING MOTION OF AN INDUSTRIAL ROBOT WITH A POSITION SWITCH

(75) Inventors: Magnus Hellberg, Eskilstuna (SE); Mats Thulin, Västerås (SE); Michael Fors, Västerås (SE); Pierre Mikaelsson, Shanghai (CN); Tommy Thors, Västerås (SE); Sönke Kock, Västerås (SE); Kevin Behnisch, Bad Nauheim (DE); Peter Eriksson, Västerås (SE); Jan Bredahl, Västerås (SE); Bo Toresson, Köping (SE)

(73) Assignee: ABB AB, Västeras (SE)

( * ) Notice: Subject to any disclaimer, the term of this patent is extended or adjusted under 35 U.S.C. 154(b) by 817 days.

(21) Appl. No.: 12/085,145

(22) PCT Filed: Nov. 14, 2006

(86) PCT No.: PCT/EP2006/068443
§ 371 (c)(1),
(2), (4) Date: May 16, 2008

(87) PCT Pub. No.: WO2007/057390
PCT Pub. Date: May 24, 2007

(65) Prior Publication Data
US 2010/0217434 A1    Aug. 26, 2010

Related U.S. Application Data

(60) Provisional application No. 60/736,835, filed on Nov. 16, 2005.

(51) Int. Cl.
*G05B 15/00* (2006.01)
*G05B 19/00* (2006.01)

(52) U.S. Cl. ........ 700/261; 700/245; 700/249; 700/250; 700/256

(58) Field of Classification Search .................. None
See application file for complete search history.

(56) References Cited

U.S. PATENT DOCUMENTS 4,011,437 A * 3/1977 Hohn ................. 318/568.23
4,025,838 A * 5/1977 Watanabe ................ 700/257
(Continued)

FOREIGN PATENT DOCUMENTS
JP         01321192 A       12/1989

OTHER PUBLICATIONS
PCT/ISA/210—International Search Report—May 18, 2007.
(Continued)

*Primary Examiner* — Khoi Tran
*Assistant Examiner* — Bhavesh V Amin
(74) *Attorney, Agent, or Firm* — Venable LLP; Eric J. Franklin

(57) ABSTRACT

A method for controlling a multi-axis industrial robot or manipulator arranged with a robot control unit. The robot or the control unit includes at least one first computer running a servo controller. A motion limit is configured for at least one axis of the robot arm. A reference signal for a robot position is sent to a robot controller together with a measurement of a position of the robot arm. The reference position is processed and the measured position and the processed reference position are then compared in an evaluator for the purpose of limiting the motion of an arm of the robot.

41 Claims, 11 Drawing Sheets

U.S. PATENT DOCUMENTS

| | | | | |
|---|---|---|---|---|
| 4,338,672 | A * | 7/1982 | Perzley et al. | 700/249 |
| 4,431,366 | A * | 2/1984 | Inaba et al. | 414/735 |
| 4,460,826 | A * | 7/1984 | Pryor | 250/227.2 |
| 4,481,592 | A * | 11/1984 | Jacobs et al. | 700/254 |
| 4,484,294 | A * | 11/1984 | Noss | 700/257 |
| 4,486,843 | A * | 12/1984 | Spongh et al. | 700/257 |
| 4,494,060 | A * | 1/1985 | Chitayat et al. | 318/568.16 |
| 4,502,109 | A * | 2/1985 | Delmege et al. | 700/69 |
| 4,570,217 | A * | 2/1986 | Allen et al. | 700/83 |
| 4,571,149 | A * | 2/1986 | Soroka et al. | 414/749.1 |
| 4,587,607 | A * | 5/1986 | Kurakake | 700/169 |
| 4,602,345 | A * | 7/1986 | Yokoyama | 700/251 |
| 4,603,284 | A * | 7/1986 | Perzley | 318/568.14 |
| 4,608,651 | A * | 8/1986 | Murakami et al. | 700/250 |
| 4,633,392 | A * | 12/1986 | Vincent et al. | 710/104 |
| 4,743,819 | A * | 5/1988 | Hashizume | 700/252 |
| 4,786,847 | A * | 11/1988 | Daggett et al. | 318/568.2 |
| 4,864,206 | A * | 9/1989 | Onaga et al. | 318/568.11 |
| 4,866,641 | A * | 9/1989 | Nielsen et al. | 700/302 |
| 4,888,708 | A * | 12/1989 | Brantmark et al. | 700/264 |
| 4,894,598 | A * | 1/1990 | Daggett | 318/568.16 |
| 4,973,215 | A * | 11/1990 | Karlen et al. | 414/729 |
| 4,989,161 | A * | 1/1991 | Oaki | 700/261 |
| 5,019,761 | A * | 5/1991 | Kraft | 318/568.11 |
| 5,038,243 | A * | 8/1991 | Gordon | 341/2 |
| 5,046,022 | A * | 9/1991 | Conway et al. | 700/250 |
| 5,049,796 | A * | 9/1991 | Seraji | 318/568.1 |
| 5,051,675 | A * | 9/1991 | Okumura et al. | 318/568.1 |
| 5,081,593 | A * | 1/1992 | Pollack | 700/253 |
| 5,155,423 | A * | 10/1992 | Karlen et al. | 318/568.11 |
| 5,198,736 | A * | 3/1993 | Azuma et al. | 318/568.1 |
| 5,343,397 | A * | 8/1994 | Yoshino et al. | 701/23 |
| 5,378,969 | A * | 1/1995 | Haikawa | 318/568.12 |
| 5,459,382 | A * | 10/1995 | Jacobus et al. | 318/568.11 |
| 5,530,331 | A * | 6/1996 | Hanei | 318/592 |
| 5,558,196 | A * | 9/1996 | Nihei et al. | 192/142 R |
| 5,586,224 | A * | 12/1996 | Kunii et al. | 700/260 |
| 5,641,415 | A * | 6/1997 | Kosaka et al. | 219/86.25 |
| 5,711,736 | A * | 1/1998 | Kyodo | 475/149 |
| 5,769,640 | A * | 6/1998 | Jacobus et al. | 434/262 |
| 5,825,981 | A * | 10/1998 | Matsuda | 700/248 |
| 5,912,540 | A * | 6/1999 | Kosaka et al. | 318/568.14 |
| 6,033,415 | A * | 3/2000 | Mittelstadt et al. | 606/130 |
| 6,104,158 | A * | 8/2000 | Jacobus et al. | 318/568.11 |
| 6,125,337 | A * | 9/2000 | Rosenberg et al. | 702/153 |
| 6,180,898 | B1 * | 1/2001 | Terada et al. | 200/51 LM |
| 6,232,735 | B1 * | 5/2001 | Baba et al. | 318/567 |
| 6,246,200 | B1 * | 6/2001 | Blumenkranz et al. | 318/568.11 |
| 6,330,493 | B1 * | 12/2001 | Takahashi et al. | 700/245 |
| 6,434,448 | B1 * | 8/2002 | Kosaka et al. | 700/245 |
| 6,778,867 | B1 * | 8/2004 | Ziegler et al. | 700/79 |
| 6,801,008 | B1 * | 10/2004 | Jacobus et al. | 318/568.11 |
| 6,801,187 | B2 * | 10/2004 | Stewart et al. | 345/156 |
| 6,897,626 | B2 * | 5/2005 | Fujibayashi et al. | 318/85 |
| 6,999,851 | B2 * | 2/2006 | Kato et al. | 700/245 |
| 7,024,276 | B2 * | 4/2006 | Ito | 700/245 |
| 7,096,076 | B2 * | 8/2006 | Weinhofer et al. | 700/61 |
| 7,130,718 | B2 * | 10/2006 | Gunnarsson et al. | 700/254 |
| 7,236,852 | B2 * | 6/2007 | Moridaira et al. | 700/245 |
| 7,345,672 | B2 * | 3/2008 | Jacobus et al. | 345/156 |
| 7,427,200 | B2 * | 9/2008 | Noble et al. | 434/274 |
| 7,439,951 | B2 * | 10/2008 | Rosenberg et al. | 345/156 |
| 7,500,853 | B2 * | 3/2009 | Bevirt et al. | 434/262 |
| 7,657,345 | B2 * | 2/2010 | Endo et al. | 700/249 |
| 2004/0236467 | A1 * | 11/2004 | Sano | 700/245 |
| 2005/0267637 | A1 * | 12/2005 | Lapham | 700/245 |
| 2005/0278099 | A1 * | 12/2005 | Benckert et al. | 701/50 |
| 2006/0156852 | A1 * | 7/2006 | Haniya | 74/490.03 |
| 2008/0046226 | A1 * | 2/2008 | Massie et al. | 703/18 |
| 2010/0217434 | A1 * | 8/2010 | Hellberg et al. | 700/245 |

OTHER PUBLICATIONS

PCT/ISA/237—Written Opinion of the International Searching Authority—May 18, 2007.

* cited by examiner

METHOD AND DEVICE FOR CONTROLLING MOTION OF AN INDUSTRIAL ROBOT WITH A POSITION SWITCH

CROSS-REFERENCE TO RELATED APPLICATIONS

This application claims priority to U.S. provisional patent application 60/736,835 filed 16 Nov. 2005 and is the national phase under 35 U.S.C. §371 of PCT/EP2006/068443 filed 14 Nov. 2006.

TECHNICAL FIELD

The present invention concerns an industrial robot and relates to a method, a device and a system for limiting extent of motion in one or more axes of the robot.

BACKGROUND ART

Programmable, servo-controlled machines like industrial robots are often equipped with position switches for limiting their workspace or allow interlocking of the machine with other moving equipment. These position switches often use a machined cam to define the switching positions. In particular positions switches are often used in applications where occupational safety regulations have to be followed.

U.S. Pat. No. 5,558,196 to Nehei et al entitled Device for detecting limits of rotational motion in a robot (Fanuc) a device for detecting the limits of rotational motion of a rotating member of an industrial robot, wherein the rotating member rotates in a first and a second rotational direction about an axis relative a fixed member. The device comprises a limit switch provided on a rotating member and a contact piece, provided on the fixed member to activate the limit switch. The device does not appear to require adjustment of the contact piece. However the casting for the arm appears to require additional material to form a circular wall around the arm followed by machining to shape a circumferential wall on the rotating member to which the contact piece will be attached.

Generally speaking, mechanical position switches are expensive, require maintenance, and need additional cables between machine and controller. Each limit switch generally requires periodic replacement and/or repair.

Solutions are known that use an electronic supervision of reference and measured position of at least one servo axis providing a position switch function that does not rely on limit switches and mechanical cams. U.S. Pat. No. 6,778,867 to Ziegler et al, entitled Monitoring and control of a handling device, describes a monitoring and control device for monitoring a technical system having at least one portable and/or mobile and/or immobile device, and more specifically, a handling device that is a arranged in a protective device, and further including at least one preferably central or decentralized control unit and actuators connected thereto to carry out dangerous actions.

Electronic supervision solutions may typically require that a difference between a reference value and a measured position shall stay below a predetermined threshold. This type of supervision may however, trigger a stop because the control error exceeds the threshold due to some unforeseen robot movement. Amongst other things, a difference between reference and measured positions, which may be seen as a type of servo control error, may increase due to dynamic effects such as servo lag and transients during acceleration. As a consequence, the threshold may be set at a level which less than optimal.

SUMMARY OF THE INVENTION

An embodiment of the present invention provides an improvement to methods for controlling the motion of a multi-axis industrial robot or manipulator arranged with a robot control unit, the robot or the control unit also comprising at least one first computer running a servo controller, and the method comprising registering a motion limit for at least one axis of said robot arm, providing a reference signal for a robot position to a robot controller and making a measurement of a position of at least one axis of said robot arm for the purpose of limiting the motion of said arm of said robot, wherein a motion limit of said at least one said axis is provided by running in a first computer a model-based evaluator of a position switch and by modelling a position of said at least one axis of said robot arm dependent on said reference signal and comparing the modelled position to the measured position.

Another embodiment of the present invention provides a method wherein the modelled position of said at least one axis is provided with a trust value.

According to another embodiment a method is provided wherein the modelled position is calculated by means of a second computer provided in the robot or robot control unit.

According to another embodiment a method is provided wherein at least one axis of a robot arm is arranged without a hardware position switch or a mechanical rotational stop means.

According to another embodiment a method is provided wherein a servo loop model for said at least one axis and a model for at least one gearbox is run in the model-based evaluator of the position switch.

Another embodiment of the present invention provides a method wherein are comprised steps of reading a reference or target values sent to the servo control for said at least one axis, a reading measurement value for actual motor position for the at least one axis, and modelling in the model-based evaluator a servo control loop, modelling a gearbox and calculating a first position and a trust value for the first position.

According to another embodiment a method is provided wherein a weighting function of the model-based evaluator is changed dependent on a change of the operational mode of a servo control loop.

Another embodiment of the present invention provides a method wherein a first position and trust value are calculated with a first model-based evaluator running on a first computer running the servo control, and a second position and trust value are calculated by means of second instance of a model-based evaluator running on the second computer.

Another embodiment of the present invention provides a method which further comprises sharing the control loop of the second instance of the model-based evaluator running on the second computer with the first model-based evaluator running on the first computer.

According to another embodiment a method is provided wherein the trust signals are compared and when at least 2 trust signals are evaluated positive the position may be a handled as a safety-evaluated position, and method wherein the trust signals are compared and when at least 2 trust signals are not both positive a signal may be generated indicating an internal error.

According to another aspect of the invention an improvement to a device for controlling the motion of a multi-axis industrial robot or manipulator arranged with a robot control unit is provided wherein said device includes a position switch comprising at least one first computer for servo control, a means for reading an actual position value and comparing it to reference signal for the purpose of limiting the motion of an arm of said robot in at least one axis, which device is arranged with at least one second computer running a model-based evaluator comprising means for modelling by means of a servo loop model a first position of said at least one axis dependent on said reference signal, comparing the modelled first position with a measured position of the at least one axis, and generating a control signal based on a function of the modelled first position.

According to another embodiment a device is provided wherein the model-based evaluator comprises means for running a servo loop model for the at least one axis and a model for at least one gearbox.

According to another embodiment a device is provided wherein the servo loop model comprises at least one parameter describing a delay, and the gearbox model comprises at least one revolution counter and at least one parameter for the gearbox speed reduction ratio.

According to another embodiment a device is provided wherein the model-based position switch comprises means for inputting a target or reference value sent to the servo control for the at least one axis, inputting a measurement value for an actual position of the at least one axis, and means for modelling a servo control loop, modelling a gearbox to calculate a first position and a trust value for the first position, and means for generating a control signal based on the status of the model-based evaluator of at least on axis.

According to another embodiment a device is provided wherein the model-based position switch comprises a single main board and at least two computers or processors for running at least one instance of a model-based evaluator.

An improved position switch according to an embodiment of the invention provides a method and device to limit the working area of a robot by software control. The software control is provided by using a position switch including at least one model based evaluator to evaluate a measured position and compare that to a reference position. The position is also assigned a trust value. Traditionally robots are developed with the option to use adjustable mechanical stops or cams and limit switches to carry out the function of a position switch on different axes of a robot arm. The mechanical elements, the stops, electro-mechanical limit switches or cams require space and machining on robot arm, which in return is costly and the arm is heavier.

By utilizing software control it is possible to make robot arm more compact, light and cost efficient. When a cam or other mechanical stop is not required on a part of the robot arm, that part will not require: extra space on the casting; costly machining to machine the cam etc out of the extra casting shape; a heavier structure. The benefits are multiplied somewhat because less material is needed on rotating parts, thus reducing load on the robot during operation. In addition no limit switches need to be adjusted, replaced or repaired. Maintenance required during total product life is reduced in terms of requirement both for repair and replacement.

Another advantage of the improved position switch is that re-configuring of the robot for other tasks is simplified. The present invention provides a more efficient way to re-configure motion limits and define a robot safe space. A programmed work envelope does no longer have to be the same as a total theoretical work envelope for the robot. It is no longer necessary for an engineer or technician to stop a robot in order to manually adjust limit switches or stop pieces on an arm or fixed part of the robot. In addition, the robot may be used to carry out one or more tasks in close cooperation with human operators in a safe manner according to industrial safety standards because of the improved limitation of the robot active working area provided by the improved position switch. Another advantage of the improved position switch is that logical combinations of axis limits for different axes of the robot may be quickly and simply set or re-set. In addition, the improved position switch may provide robot arm position information to a control unit during a time in which the robot is at a standstill, and so maintaining safety and synchronisation of the different axes of the robot arm.

In a preferred embodiment of the invention the improved position switch comprises one or more microprocessor units or computers. The control unit(s) comprises memory means for storing and/or running one or more computer programs that carry out the operations of the improved position switch. Preferably a such computer program contains instructions for the one or more processors to perform the method as mentioned above and described in more detail below. In one embodiment the computer program is provided on a computer readable data carrier such as a CD ROM.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

An improved position switch according to an embodiment of the invention provides a programmable electronic position switch in the form of an electronic computer with at least one CPU and associated memory, and a model-based evaluator, MBV. The MBV is run in the CPU which is connected to a communication channel where references that are sent to a servo controller can be "read", and also connected to a measurement channel where motor positions are readable. The MBV has at least one model for each servo axis and at least one model for each gearbox of the machine under supervision.

Figure 1:
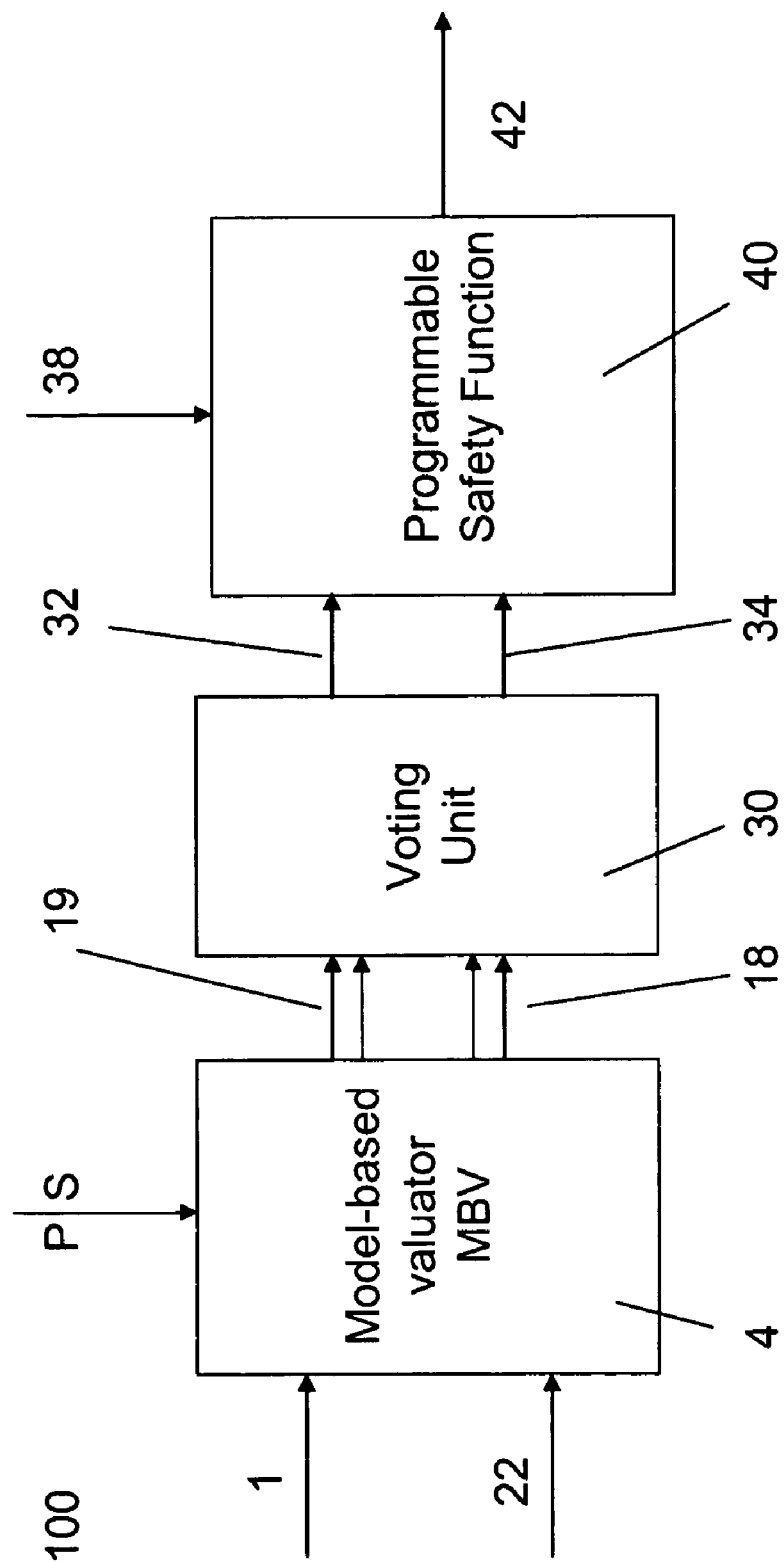
FIG. 1 shows a simplified block diagram of an embodiment of the electronic position switch comprising a Model based Evaluator (MBV) according to an embodiment of the invention.

FIG. 1 shows an improved position switch 100 in the form of a programmable electronic position switch according to an embodiment of the invention. It shows a Model Based Evaluator (MBV) 4, a Voting Unit 30 and a Programmable Safety Function 40. The Programmable Safety Function may be configured by a safety program 38 or by configuration. The MBV is supplied with a position reference 1 and a position measurement 22. The servo loop model of the MBV is supplied with parameters P and sensitivity settings S. The MBV outputs trust evaluated positions 19 and trust values 18 associated with those positions to the Voting Unit 30. The Voting Unit supplies a safety enhanced position 32 and an error signal 34 when appropriate in the form of a dual channel error signal to the Programmable Safety Function. The Programmable Safety Function provides safety signals 42 to the robot control system.

Figure 2:
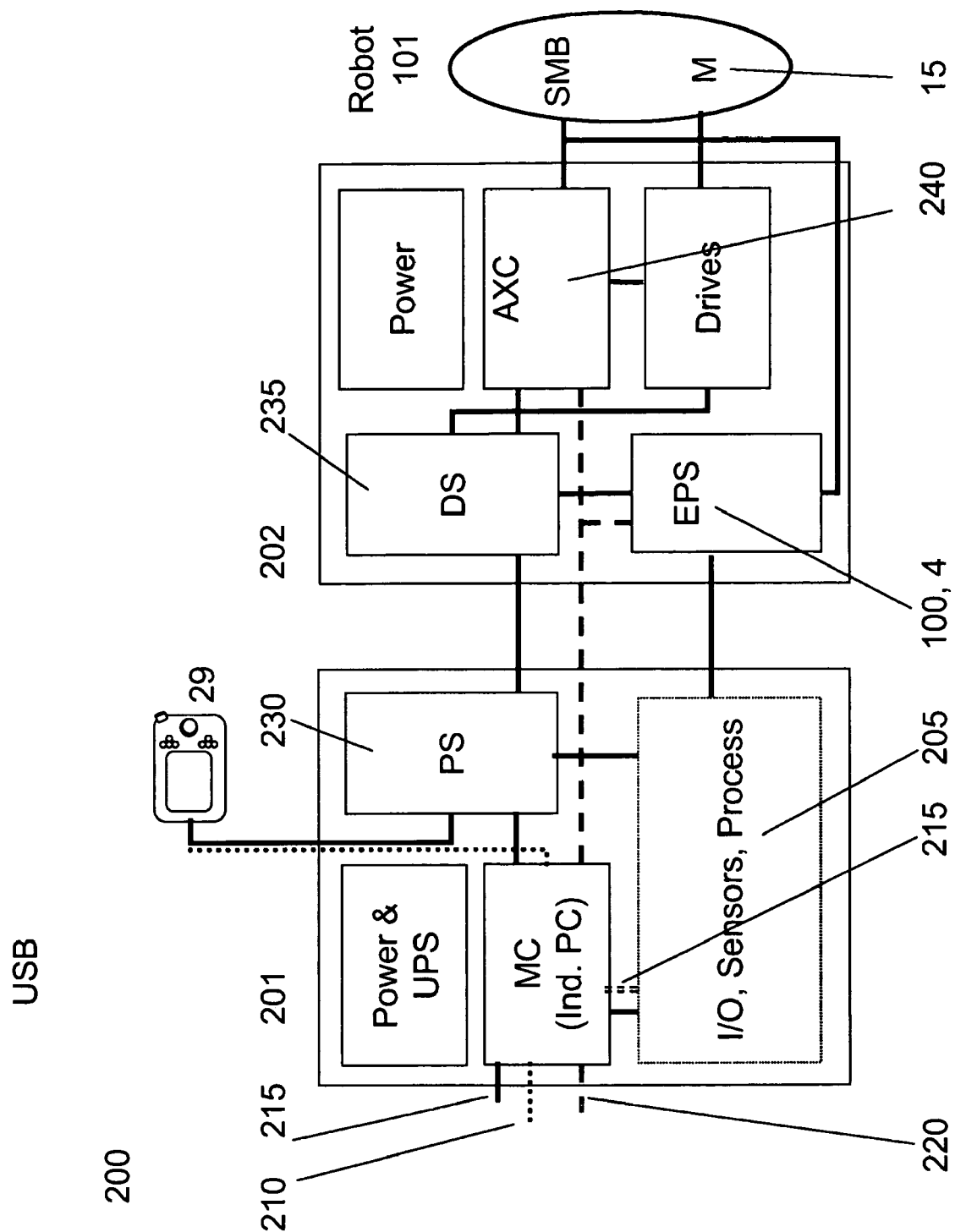
FIG. 2 shows a general control scheme for a robot which includes an electronic position switch according to an embodiment of the invention.

FIG. 2 shows an arrangement for controlling a robot 101 comprising an embodiment of the programmable electronic position switch 100. It shows a Control Module 201 comprising a Panel Safety function 230, which may also be arranged connected with a teach pendant unit 29. A motion limit may be configured, for example via the Panel Safety functions PS or the TPU 29, or via another suitably connected part of the control system. Such a motion limit specifies a limit to the extent of motion of one or more axes of the robot. When a motion limit has been configured or registered, the control system ensures that the robot keeps within the limit by tracking the robot position as determined by the electronic position switch. In the event that the robot position is not determined to be reliable, or if an error has occurred, safety functions or alarms are triggered. The Control Module may also comprise Power and UPS functions, a computer 225, and a series of I/O interfaces 205 to sensors and/or process signals. Functions in the control module may be connected by means of a LAN 210 or a USB 215 bus connection or a Service line 220 or by an Ethernet-type connection 215. FIG. 2 also shows a Drive Module.

The Drive Module 202 comprises a programmable electronic position switch 100 comprising an MPV 4 connected to a Drives and Safety module 235, to the I/O interfaces 205 to the computer 225 of the Control Module and to an axis computer function 240. In the third module of the diagram, a robot 101 is shown which comprises a motor 15 and a serial measurement board SMB, which handles data from at least one axis.

A programmable electronic position switch according to an embodiment of the invention comprises a model-based evaluator MBV, which contains at least one model of the servo loop for each axis, at least one model of each gearbox in use, typically a filter element, and at least one weighting function (see also FIG. 3a and below). The MBV reads measurement and reference values. After evaluation, it passes on at least one resulting trust-valued position to the Voting Unit 30 of FIG. 1 together with a value indicating the amount of trust that is put in each position value, typically a number between 0 (don't trust) and 1 (fully trust). Alternatively, a low trust value can be represented by an error signal causing special action, e.g. turning on a light, sending a message via a communication channel etc.

Figure 9:
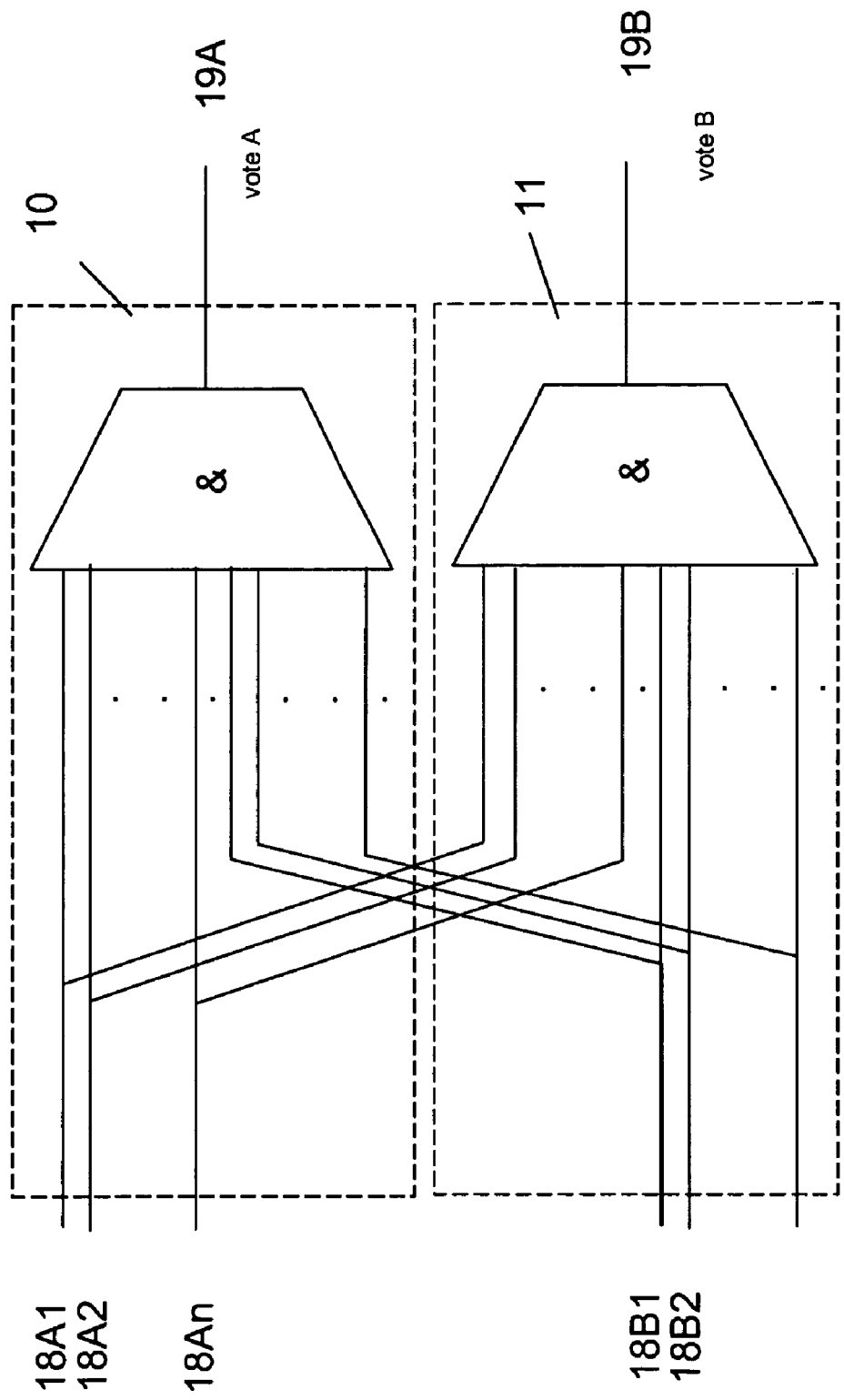
FIG. 9 shows a simplified block diagram for a process of trust voting unit of an electronic position switch according to an embodiment of the invention.

The Voting Unit decides, based on receipt of a multitude of position signals with associated trust values, which (if any) position signal can be trusted and if enough signals with high trust level are present to give a confidence vote on the validity of a position measurement. The Voting Unit has to make 2 decisions on 2×2n trust values. (See also FIG. 9.) If the voting unit decides to trust the available positions, in a third unit 40, user-defined operations on the position can be performed (programmable safety functions). In addition to axis limits and axis ranges, operations such as speed supervision and standstill supervision may be selected. Standstill supervision involves maintaining accurate position information during a standstill or stop period so that position accuracy and safety requirements may be met even while the robot is not moving. Maintaining or even updating reliable and accurate determinations of position during standstill provides a basis for maintaining accurate synchronisation between the different moving parts of the robot.

Figure 3A:
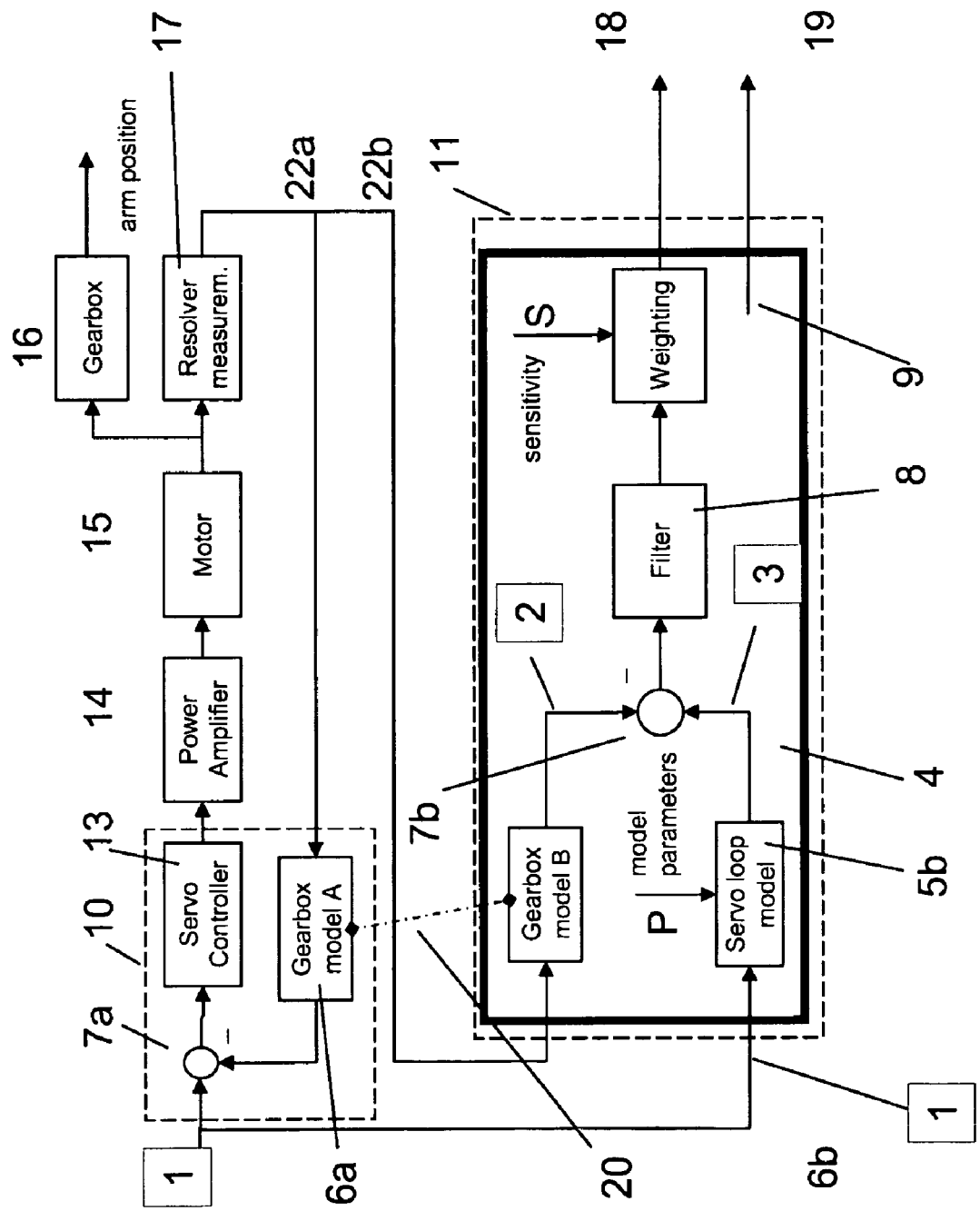
FIG. 3a shows a single channel MBV that is connected to a servo controller according to an embodiment of the invention.

FIG. 3a shows another embodiment of the invention comprising a single channel MBV that is connected to a servo controller. The figure shows an MBV 4 which comprises a gearbox model 6B, a servo loop model 5B for at least one axis, a filter 8 and a weighting function 9 all running in a second computer or processor B. FIG. 3a also shows a Computer 10, CPU or processor A running a servo controller and a gearbox model 6a. Computer A is in turn connected to a power amplifier 14, to a drive motor 15, and a gearbox 16. The output of Computer A is also connected to a sensor means 17 in the motor, a sensor such as a resolver. A position reference 1 (arrow from left of diagram) is supplied to Computer A (10) running the servo controller 13 and the servo controller output amplified at 14 fed to the motor 15 results in a movement of the gearbox 16 and moves the arm to a given arm position (arrow right of diagram). Resolver or other sensor measurement from 17 is fed back 22a to the gearbox model A, and summed or subtracted 7a with the reference and then supplied to the servo controller 13. Resolver measurement is also fed back and made available 22b to the second gearbox model B. Gearbox model B outputs the position reference 2 after modeling to summator 7b where it may be combined with output 3 from the servo model after modeling the reference position 1. In this embodiment, the servo controller process is preferably executed on a first computer A (10) or CPU and the MBV is executed on a second computer B (11) or CPU as shown in FIG. 3a. The MBV contains at least one gearbox model 6b and one servo loop model 5b, a comparator, summator or subtracting element 7b, a filter 8 and a weighting element 9. The output from the single channel after weighting function 9 is a trust value 18 and a safety-valuated position (19) which may be 1, 2, or 3 or a linear combination of 1, 2 and 3.

An example of a simple servo loop model could be a delay element representing one or more communication delays and a servo lag. The filter element preferably reduces high frequency components of the difference signal, typically occurring during acceleration of the servo motor. The weighting function may, in the simplest case, be a comparator giving an output signal 1 if the input signal is below a certain threshold, and 0 if above. Alternatively, the weighting function can be smooth giving intermediate values also. In general, the trust value may be reduced when the error between the measured position that was sent through the gearbox model and the position predicted by the servo loop model increases, and vice versa. Preferably the values 0 and 1 are used as trust values and the weighting function is a threshold function. Gearbox model A and gearbox model B may be synchronised as indicated by data connection 20.

Figure 3B:
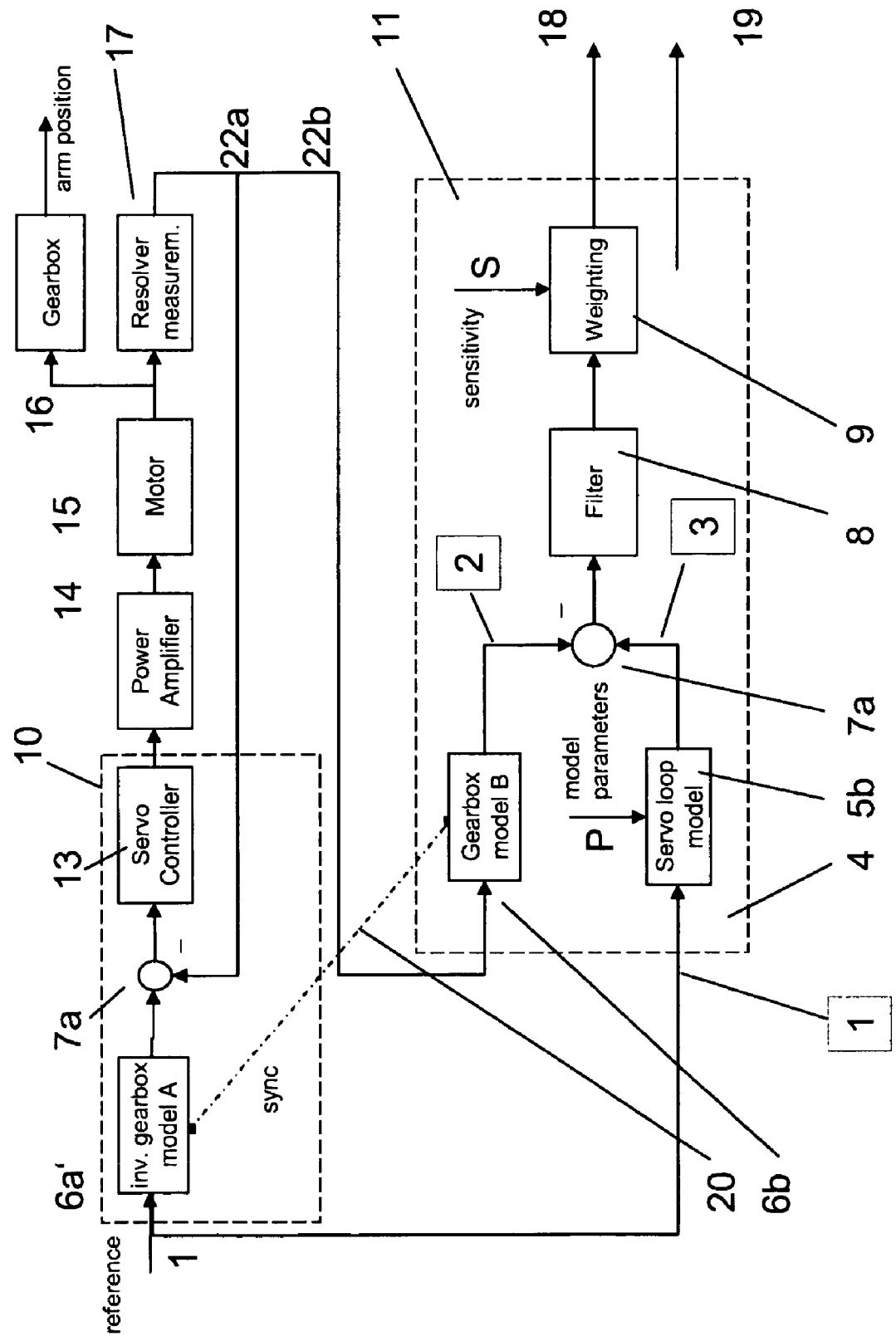
FIG. 3b shows an alternative implementation an MBV connected to a servo control loop.

FIG. 3b shows an alternative implementation of a servo control loop. Sensor or resolver measurement from 17 is not supplied to Computer A running the servo controller, and is instead supplied with the reference value to an inverse gearbox model 6a' in computer A before summation or subtraction 7a and subsequent supply to the servo controller 13. The output from the single channel evaluator after weighting function 9 is similar to embodiment of FIG. 3a, trust value 18, safety-valuated position 19 which may be 1, 2, or 3 or a linear combination of 1, 2 and 3.

In one embodiment, the MBV comprises a comparator with a dual-channel modeling of measured position for comparison with a reference position. If the difference in one of two channels exceeds a threshold, the trust into the comparison is set to zero, which means that either of the signals, the servo controller or the MBV itself may be faulty, and if otherwise then set to one. In the case of a fault, the voting unit thus will receive two position signals with at least one trust value zero, and will in consequence decide to set an error signal.

Figure 5:
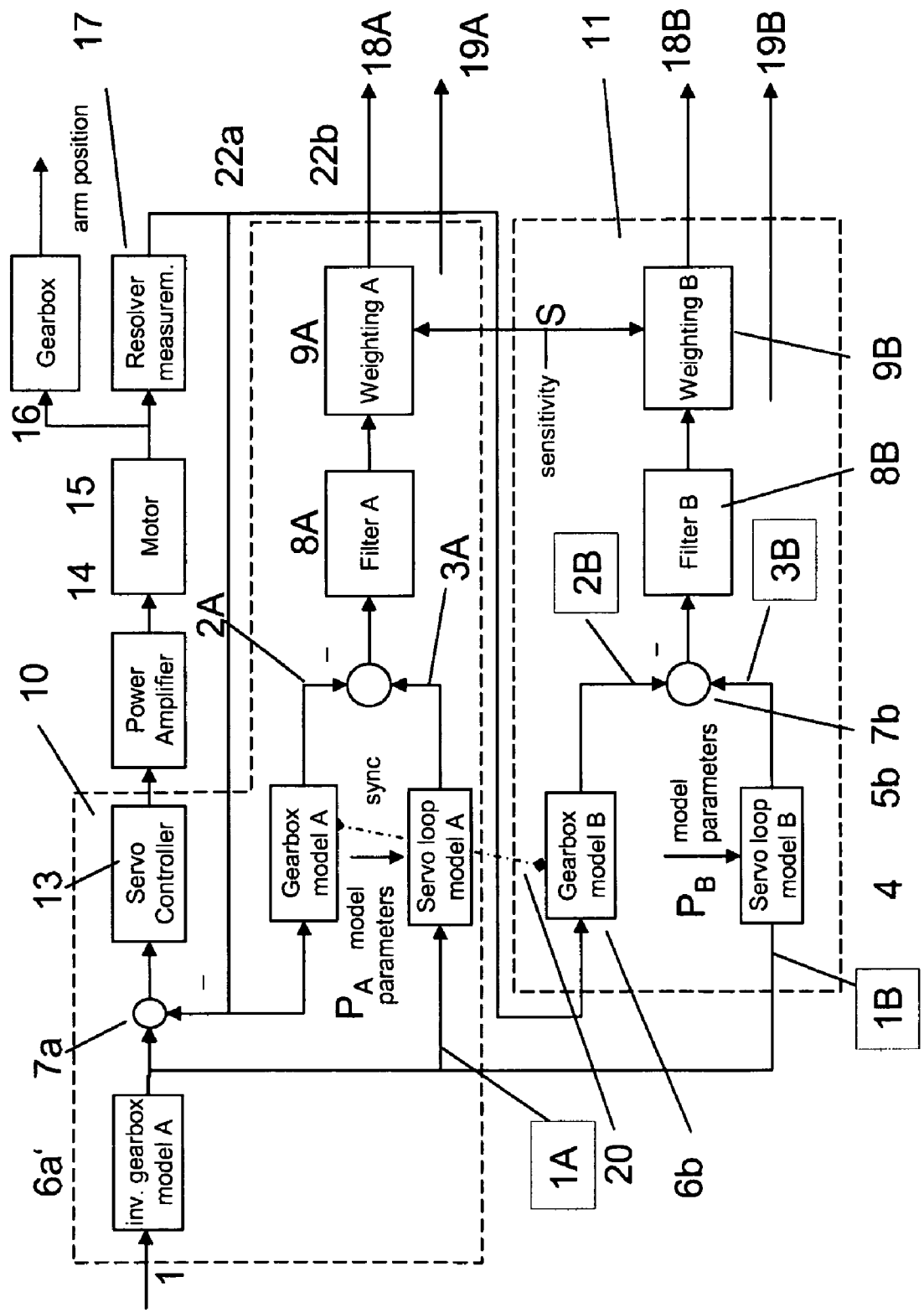
FIG. 5 shows a simplified block diagram of a dual channel MBV comprising at least two instances of the MBV according to another embodiment of the invention.

FIG. 5 shows a MBV of a dual channel model according to another embodiment of the invention comprising a first computer A (10) which is responsible for computing both the servo controller and one instance of an MBV, and a computer B which computes a second instance of an MBV. Both MBVs comprise a gearbox model and a servo loop model. The figure shows Computer A (10) comprising a summator or comparator 7a, a Gearbox model A, a servo loop model A, a filter 8A and a weighting function 9A, the servo controller 13 and an inverse gearbox model 6a'. The reference value 1 is fed to the gearbox model A. Sensor or resolver measurement is fed back 22a to both the summator 7a and to the gearbox model A. A gearbox model B, a servo loop model B, a filter 8B and a weighting function 9B are comprised in the second computer B (11). The same sensor or resolver measurement from 17 is fed back 22b to the gearbox model B of the second instance.

The output from the first channel after weighting function 9A is a trust value 18A and a safety-valuated position A (19A) which may be 1A, 2A, or 3A or a linear combination of 1A, 2A and 3A. Similarly, the output from the second channel after weighting function 9B is a trust value 18B and a safety-valuated position B (19B) which may be 1B, 2B, or 3B or a linear combination of 1B, 2B and 3B. Other combinations of 1B, 2B and 3B may be used. When a multi-channel MBV is used, the voting unit 30 may be assigned a logic function permitting the voting unit to ignore a single non-trusted position and continue operation, but give a warning signal to have the system checked. This is a form of multiple redundancy that is also used in vehicles such as airplanes or spacecraft. If the voting unit decides to trust the available positions, user-defined operations can be performed, by means of the a third unit (Programmable Safety Functions 40), on the position. As well as applying axis limits, axis ranges and speed may be supervised. The robot may also be supervised during standstill, stop or other functions while an axis is not being driven.

Since the MBV comprises a gearbox model which may contain at least one revolution counter per axis, a mechanism indicated by data connection 20 (FIG. 3a,b, 5, 6) is needed to ensure that the revolution counter of the MBV model is synchronized with both the revolution counter used for the servo control and with the actual revolution of the real gearbox. A periodic movement of the machine against an electric switch mounted in a well-known position may for example be used for synchronisation to make sure all models provide the correct and identical arm position.

Figures 4A, 4B:
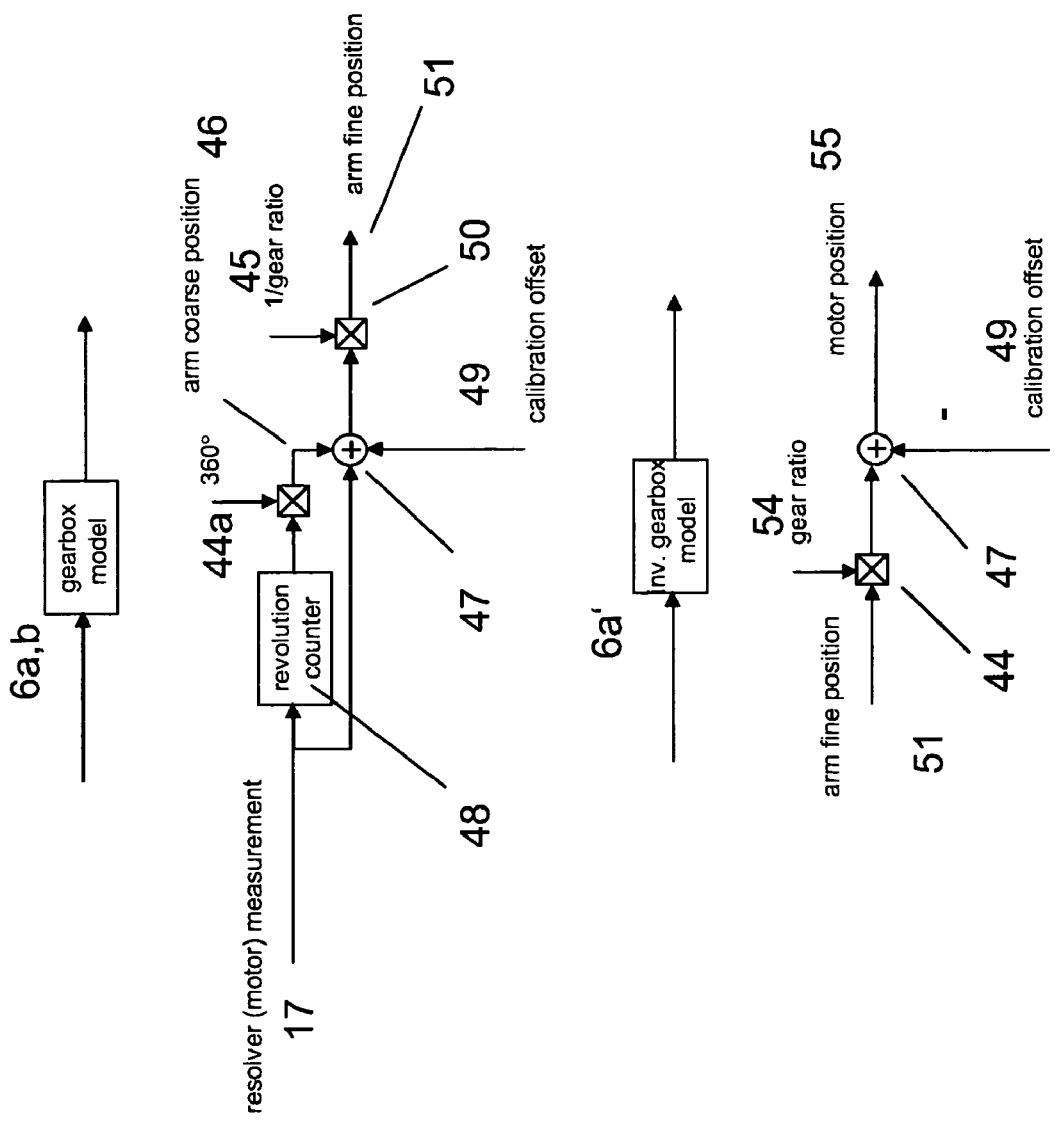
FIG. 4a shows a simple gearbox model comprising a resolver measurement signal and a revolution counter.
FIG. 4b shows a simple inverse gearbox model comprising a gear ratio and an arm fine position.

FIG. 4a shows an embodiment of a simple gearbox model 6, 6a, 6b reading a measurement signal from sensor or resolver 17, and comprising a revolution counter 48, a multiplier 44a, a summator 47 which may receive a calibration offset 49, an inverse gear ratio 45, and a second multiplier 50. An arm coarse position signal 46 is calculated after first multiplier 44a and an arm fine position signal 51 is calculated after second multiplier 50. FIG. 4b shows an embodiment of a simple inverse gearbox model 6a' comprising an input for an arm fine position 51, a gear ratio 54, a multiplier 44, an input 49 for a calibration offset, and a motor position output at 55.

In a development according to another embodiment a mode of the supervision may allow the weighting function to be changed during operation by an input signal or by a signal internally generated based on reference and measured position. For example, one application of this procedure would be to relax the threshold of a control error in operations where lower degree of safety is required, and the servo controller gain is reduced to allow an external equipment to move the servo axis. This may be used for example when running the robot in compliant mode or other modes for purposes such as for teaching, programming or configuration.

The electronic position switch according to an embodiment of the invention may be configured to define at least one limit for at least one axis, and a signal is sent and/or output is set whenever said axis reaches the set limit. It is also provided possible that a signal may be generated instead or as well based on a logical combination of axis limits, for example: (axis 1 out of limit and axis 2 out of limit and . . . ). If the voting unit decides to trust the available positions, in a third unit, user-defined operations on the position can be performed (programmable safety functions 40), such as axis limits, axis ranges, speed supervision, standstill supervision etc. In this way, a safe working area in the proximity of robot is provided by the position switch and the use of mechanical limit switches on at least one axis of the robot arm is not required.

Figure 10:
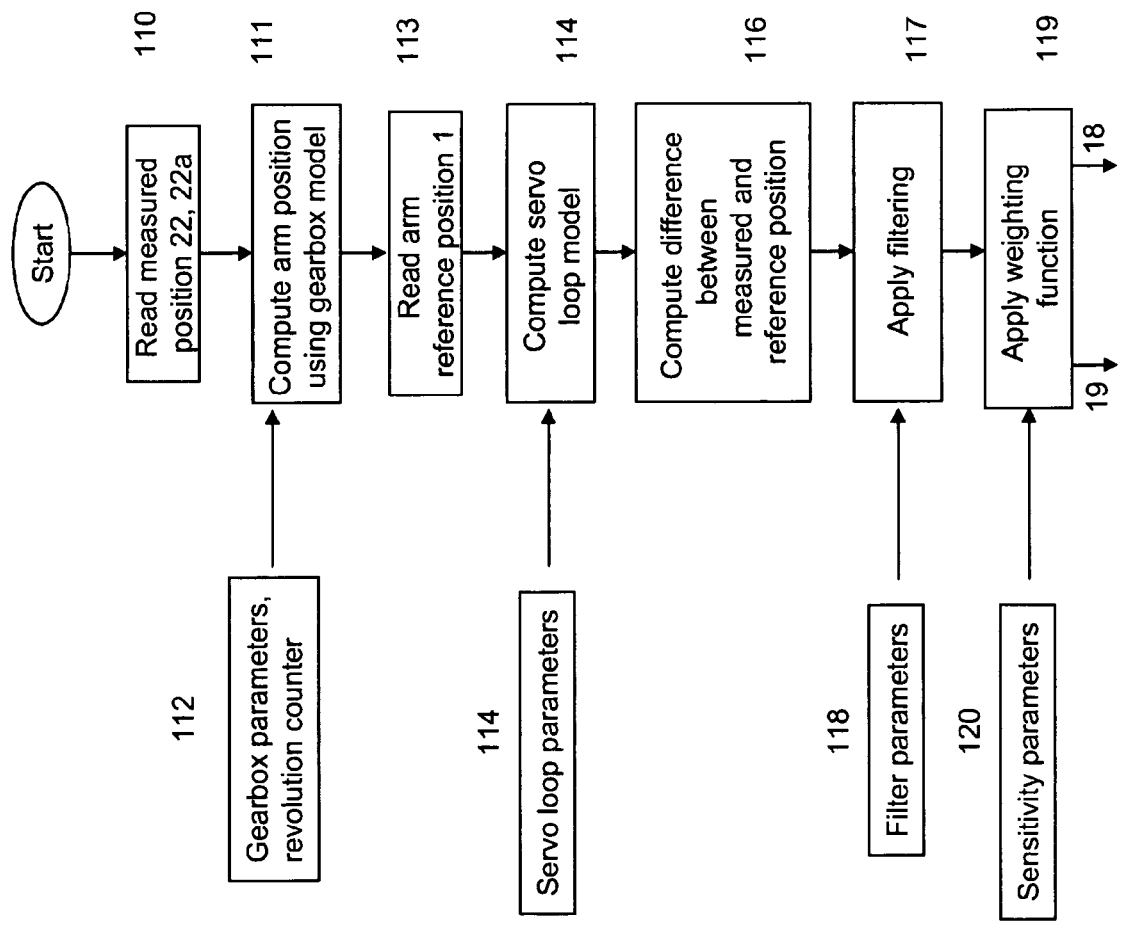
FIG. 10 shows a flowchart of an embodiment of a method for operating a position switch comprising a Model based Evaluator (MBV) according to an embodiment of the invention.

FIG. 10 shows a flowchart for a method according to an embodiment of the invention. It shows a sequence of steps comprising:

110 reading the measured position 22, 22a
111 computing an arm position using gearbox model
113 reading an arm reference position 1
114 computing a servo loop model
116 computing a difference between measured position and reference position
117 applying filtering
119 applying weighting, and generating a position value 19 and trust value 18.

It also shows that parameters P may be configured or input for the gearbox model at 112, servo loop model at 114, filter at 118 and/or sensitivity S at 119.

Figure 6:
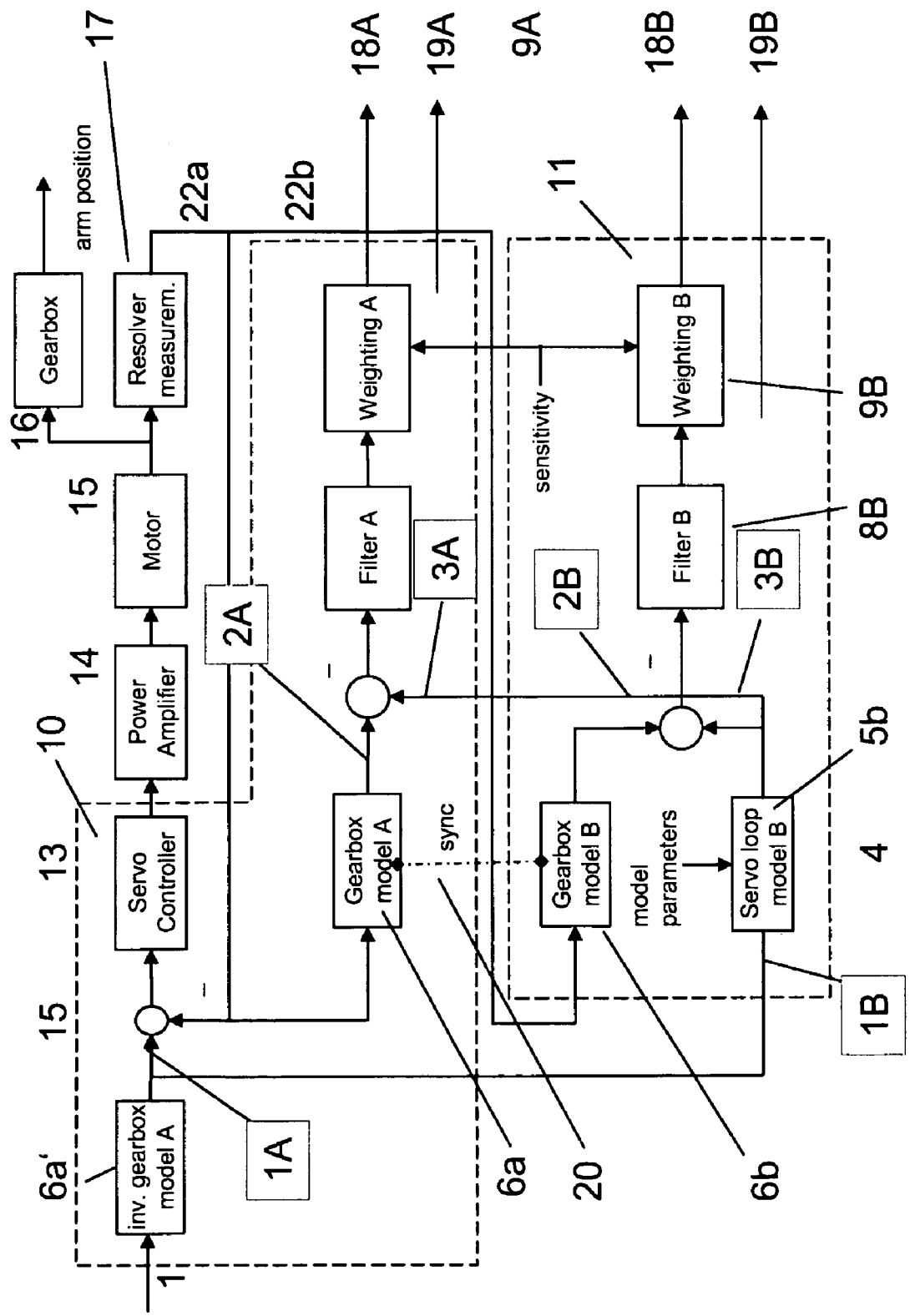
FIG. 6 shows a development of the dual channel electronic position switch wherein two or more MBVs share a servo loop model of one processor or CPU according to another embodiment of the invention.

FIG. 6 shows an embodiment of the invention according to FIG. 5, where the MBVs share the servo loop model of computer B. This solution reduces complexity, but requires real-time communication between computers A (10) and B (11).

Figure 7:
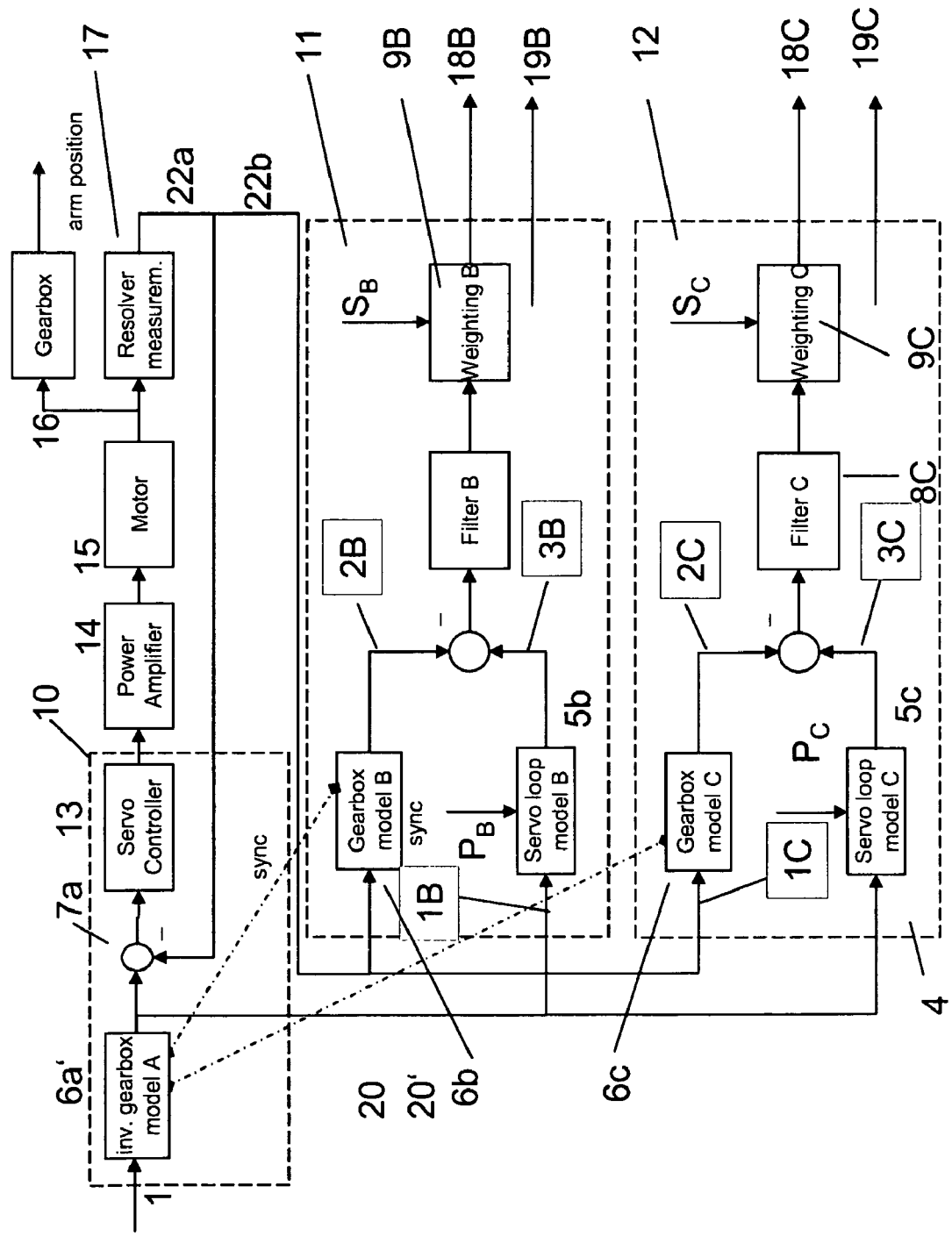
FIG. 7 shows a simplified block diagram of a dual channel MBV comprising at least two instances of MBV each running on a separate CPU and wherein the servo controller is run on a third CPU according to another embodiment of the invention.

FIG. 7 shows a dual channel, triple computer embodiment of the invention where a first computer A (10) is responsible for the servo controller, a second computer B (11) provides a first instance of an MBV, and a third computer C (12) provides a second instance of an MBV. The output from the first channel after weighting function 9B is a trust value 18B and a safety-valuated position B (19B) which may be 1B, 2B, or 3B or a linear combination of 1B, 2B and 3B. Similarly, the output from the second channel after weighting function 9C is a trust value 18C and a safety-valuated position C (19C) which may be 1C, 2C, or 3C or may be a linear combination of 1C, 2C and 3C. The output from the first channel after weighting function 9A is a trust value 18A and a safety-valuated position A (19A) which may be 1A, 2A, or 3A or a linear combination of 1A, 2A and 3A. Similarly, the output from the second channel after weighting function 9B is a trust value 18B and a safety-valuated position B (19B) which may be 1B, 2B, or 3B or a linear combination of 1B, 2B and 3B. Other combinations of 1B, 2B and 3B may be used.

Figure 8:
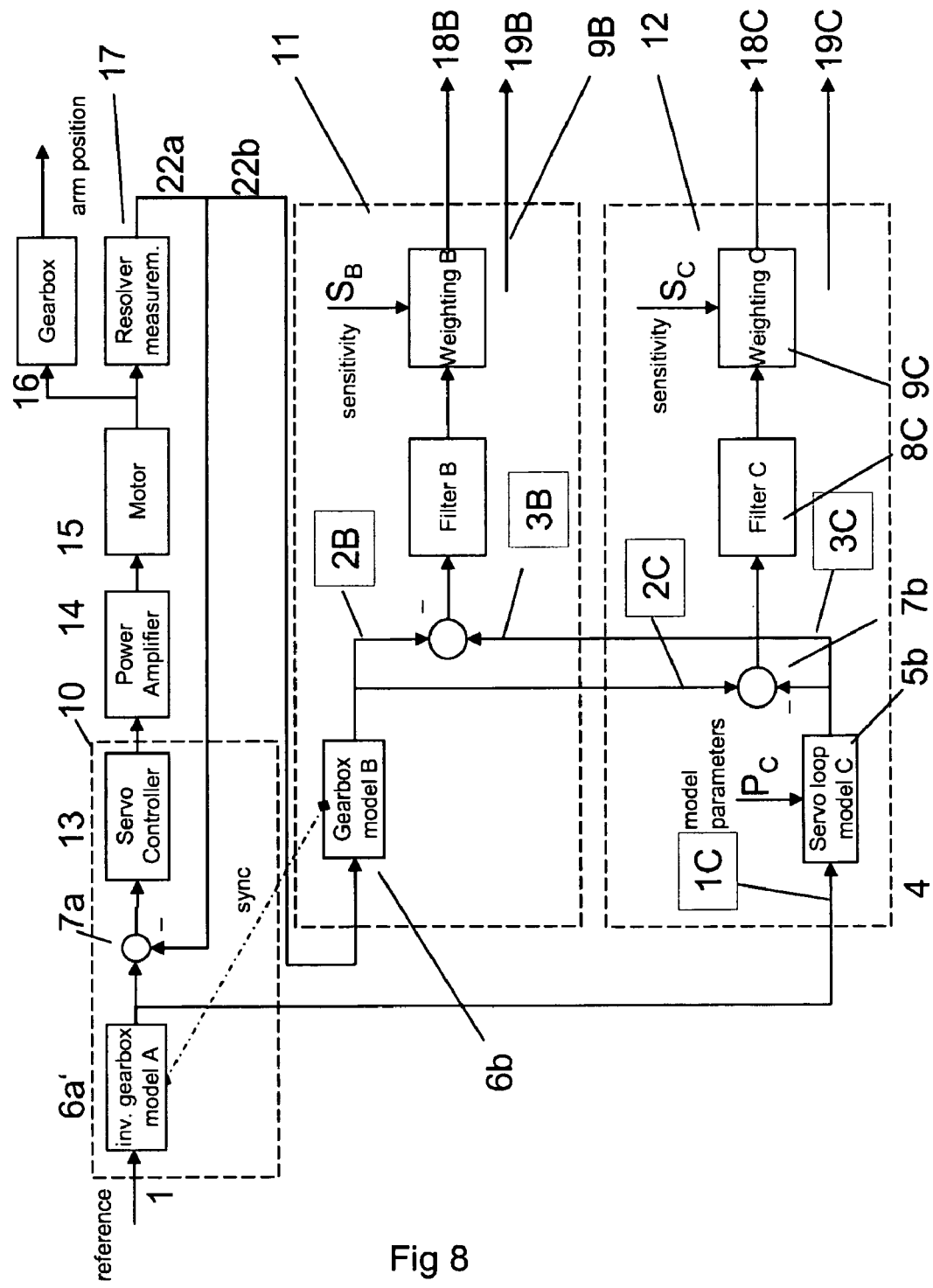
FIG. 8 shows a dual channel electronic position switch comprising at least two instances of the MBV and each instance running on a separate CPU and wherein the MBVs share the servo loop model running on one of the first two CPUs according to another embodiment of the invention.

FIG. 8 shows an embodiment according to FIG. 7, and where the two MBVs share the servo loop model of computer B. This solution reduces complexity, but requires real-time communication between computers B and C. The output from the first channel B after weighting function 9B is a trust value 18B and a safety-valuated position B (19B) which may be 2B, or 3B or a linear combination of 2B and 3B. The output from the second channel may includes modeled reference 10 to give a trust value 18C and a safety-valuated position C (19C) which may be 1C, 2C, or 3C or may be a linear combination of 1C, 2C and 3C.

The robot and/or automation application with an improved position switch according to an embodiment of present invention may applied to operations such automobile assembly and to manufacturing processes used in automobile manufacturing. The robot or automation application may be used to carry out tasks such as any of: welding, soldering, electrical soldering, riveting, fettling, painting, spray painting, electrostatic powder spraying, gluing, operations performed in relation to metal processing processes such as continuous casting, casting, diecasting and production methods for other materials such as plastic injection moulding, compression and/or reaction moulding or extrusion. The robot application may carry out other operations, including such as folding plate, bending plate and/or hemming plate. The robot application may comprise a plurality of tools, with wireless communication as well as without wireless communication. In particular, the robot may be used to carry out one or more tasks in a safe manner according to an industrial safety standards in close cooperation with human operators. The invention may also be applied to one or more robots arranged to provide a vehicle simulator application or an amusement ride.

One or more processors (or microprocessors or computers) present at least in a robot control unit, in a PLC, or in the position switch 100 each comprise a central processing unit CPU performing one or more steps of the methods according to one or more aspects of the invention. This is performed with the aid of one or more computer programs, which are stored at least in part in memory in, or in a memory storage accessible by, the one or more processors. The invention may also be run on one or more general purpose industrial microprocessors or computers instead of one or more specially adapted computers or processors, or devices such as FPGAs (field programmable gate arrays), CPLDs (complex programmable logic device) or ASICs (application specific integrated circuits).

The computer program comprises computer program code elements or software code portions that make the computer or processor perform the methods using equations, algorithms, data, stored values, calculations and other methods previously described and, for example, in relation to the flowchart of FIG. 10. A part of the program may be stored in a processor as above, but also in a ROM, RAM, PROM, EPROM or EEPROM chip, a flash memory or similar memory means. The program in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as flash memories, hard drives etc. may also be used. The program or programs may also in part be supplied from a data network, including a public network such as the Internet, via a temporary hard-wire data connection and/or via a wireless communication unit arranged to the robot or robot control unit, a local PLC and/or another computer.

The computer programs described may also be arranged in part as a distributed application capable of running on several different computers or computer systems at more or less the same time.

It should be noted that while the above describes exemplifying embodiments of the invention, there are several variations and modifications which may be made to the disclosed solution without departing from the scope of the present invention as defined in the appended claims.

The invention claimed is:

1. A method for controlling motion of a multi-axis industrial robot or manipulator arranged with a robot control unit, the robot or the control unit also comprising at least one first computer running a servo controller, the method comprising:
registering a motion limit for at least one axis of said robot arm,
providing a reference signal for a robot position to a robot controller,
making a measurement of a position of at least one axis of said robot arm for the purpose of limiting the motion of an arm of said robot,
providing a motion limit of said at least one said arm by running in at least one computer a model-based evaluator of a position switch, modelling a position of said at least one axis of said robot arm dependent on said reference signal and comparing the modelled position to the measured position,
reading reference or target values sent to the servo control for said at least one axis,
reading a measurement value for actual motor position for the at least one axis, and
modelling in the model-based evaluator a servo control loop, modelling a gearbox and calculating a first position and a trust value for the first position,
wherein a servo loop model for said at least one axis and a model for at least one gearbox is run in the model-based evaluator of the position switch.

2. The method according to claim 1, wherein the modelled position of said at least one axis is provided with a trust value.

3. The method according to claim 1, wherein the modelled position is calculated by a second computer provided in the robot or robot control unit.

4. The method according to claim 1, wherein at least one axis of said arm is arranged without a hardware position switch or a mechanical rotational stop.

5. The method according to claim 1, wherein the model-based evaluator of the position switch comprises a weighting function.

6. The method according to claim 5, wherein the weighting function of the model-based evaluator of the position switch is changed by an input signal or a signal internally generated based on a reference and a measured position.

7. The method according to claim 6, wherein the weighting function of the model-based evaluator is changed dependent on a change of the operational mode of a servo control loop.

8. The method according to claim 7, further comprising:
changing the weighting function of the model-based evaluator during an operational mode.

9. The method according to claim 1, further comprising:
synchronising a revolution counter function of the model for at least one gearbox with a servo control revolution counter and a measured gearbox position.

10. The method according to claim 1, further comprising:
calculating the first position and trust value with first model-based evaluator running on said first computer running the servo control, and
calculating a second position and trust value utilizing second instance of a model-based evaluator running on the second computer.

11. The method according to claim 10, further comprising:
sharing the control loop of the second instance of the model-based evaluator running on the second computer with the first model-based evaluator running on the first computer.

12. The method according to claim 10, further comprising:
running the servo control on said first computer,
calculating the first position and trust value with a first model model-based evaluator running on the second computer, and
calculating a second position and trust value utilizing second instance of the model-based evaluator running on a third computer.

13. The method according to claim 12, further comprising:
sharing the control loop of the first model-based evaluator running on the second computer with the second instance of the model-based position switch running on the third computer.

14. The method according to claim 2, wherein the trust values are compared and when at least two trust values are evaluated positive the position may be a handled as a safety-evaluated position.

15. The method according to claim 2, wherein the trust values are compared and when at least two trust signals are not both positive then a signal is generated indicating an internal error.

16. The method according to claim 2, wherein a safety-evaluated position and/or a trust value are modelled during a time when the robot is at a standstill or stopped.

17. The method according to claim 1, wherein the method is carried out under the instruction of a computer program comprising program instructions for making a computer computer or processor perform the method.

18. The method according to claim 17, wherein the computer program instructions are recorded one or more computer readable media.

19. A control device for controlling motion of a multi-axis industrial robot or manipulator arranged with a robot control unit, said device comprising:
at least one first computer for servo control,
a reader configured to read an actual position value and compare the actual position value to a reference signal for the purpose of limiting motion of an arm of said robot in at least one axis,
a second computer running a model-based evaluator configured to model with a servo loop model a first position of said at least one axis dependent on said reference signal, compare the modelled first position with a measured position of the at least one axis, and generate a control signal based on a function of the modelled first position,
wherein the model-based evaluator comprises an input for inputting a target value sent to the servo control for the at least one axis, and inputting a measurement value for an actual position of the at least one axis, and a servo control loop model, a gearbox model to calculate a first position and a trust value for the first position, and a control signal generator configured to generate a control signal based on the status of the model-based evaluator of at least on axis.

20. The device according to claim 19, wherein the model-based evaluator comprises an element for providing a trust value for the first position from which the control signal is generated.

21. The device according to claim 19, wherein at least one axis of said arm is arranged without a mechanical stop.

22. The device according to claim 19, wherein the model-based evaluator comprises a servo loop model for the at least one axis and a model for at least one gearbox.

23. The device according to claim 19, wherein the servo loop model comprises at least one parameter describing a delay, and the gearbox model comprises at least one revolution counter and at least one parameter for the gearbox speed reduction ratio.

24. The device according to claim 19, wherein the model-based evaluator comprises a weighting function.

25. The device according to claim 24, wherein the weighting function for the model-based position switch is arranged readable from a memory storage for changing a weighting value dependent on an input signal or a signal internally generated based on reference and a measured position.

26. The device according to claim 25, wherein the weighting function of the model-based position switch is arranged with a signal reader configured to read a signal indicating a change of operational mode of a servo control loop.

27. The device according to claim 19, further comprising:
a servo control revolution counter, the servo model comprises a revolution counter function, and a synchronizing element configured to synchronize at least one gearbox with a measured gearbox position.

28. The device according to claim 19, further comprising:
a first computer running the servo control and running a first model-based evaluator for calculating the first position and trust value, and
a second computer running a second instance of the model-based evaluator for calculating a second position and trust value.

29. The device according to claim 28, further comprising:
a communicator configured to communicate between the first and second computer arranged for sharing the control loop of the second instance of the model-based position switch running on the second computer with the first model-based position switch running on the first computer.

30. The device according to claim 28, further comprising:
a communicator configured to communicate between the second computer running the first model-based evaluator for calculating the first position and trust value and a third computer running the second instance of the model-based evaluator for calculating second position and trust value.

31. The device according to claim 19, wherein the model-based position switch comprises a single main board and at least two computers or processors for running at least one model-based evaluator.

32. A robot control system for a multi-axis industrial robot or manipulator, the system comprising:
a robot control unit, the robot or the control unit also comprising
at least one first computer running a servo controller,
a registration unit configured to register a motion limit for at least one axis of said robot arm, a reference signal source configured to provide a reference signal for a robot position to a robot controller, a measuring unit configured to make a measurement of a position of at least one axis of said robot arm for the purpose of limiting the motion of said at least one axis of said robot, at least one second computer running a model-based evaluator comprising means for modelling by a servo loop model a first position of the at least one arm dependent on said reference signal, a comparing unit configured to compare the modelled first position with a measured position of said at least one axis, and a control signal generator configured to generate a control signal based on a function of the modelled first position, wherein the model-based evaluator comprises an input for inputting a target value sent to the servo control for the at least one axis, and inputting a measurement value for an actual position of the at least one axis, and a servo control loop model, a gearbox model to calculate a first position and a trust value for the first position, and a control signal generator configured to generate a control signal based on the status of the model-based evaluator of at least on axis.

33. The system according to claim 32, wherein the model-based evaluator is comprised in a position switch.

34. The system according to claim 33, wherein the position switch comprises a voting unit and a unit comprising one or more programmable safety functions.

35. The system according to claim 33, wherein the position switch is comprised in a drive module of a robot control system.

36. The system according to claim 33, wherein said robot or the control unit further comprises means for configuring a motion limit for said at least one axis of said robot.

37. The system according to claim 36, wherein said robot or the control unit further comprises means for configuring a motion limit for said at least one axis said robot dependent on a motion limit for at least one other axis of the said robot.

38. The system according to claim 32, wherein said robot or the control unit further comprises modelling a first position of the at least one arm dependent on said reference signal and comparing the modelled first position with a measured position of said at least one axis when the at least one arm is in motion or at a standstill.

39. A computer program, comprising:

a non-transitory computer readable medium; and computer program instructions recorded on the computer readable medium and executable by a processor for carrying out a method for controlling motion of a multi-axis industrial robot or manipulator arranged with a robot control unit, the robot or the control unit also comprising at least one first computer running a servo controller, the method comprising:

registering a motion limit for at least one axis of said robot arm, providing a reference signal for a robot position to a robot controller, making a measurement of a position of at least one axis of said robot arm for the purpose of limiting the motion of an arm of said robot, providing a motion limit of said at least one said arm by running in at least one computer a model-based evaluator of a position switch, modelling a position of said at least one axis of said robot arm dependent on said reference signal and comparing the modelled position to the measured position, reading reference or target values sent to the servo control for said at least one axis, reading a measurement value for actual motor position for the at least one axis, and modelling in the model-based evaluator a servo control loop, modelling a gearbox and calculating a first position and a trust value for the first position, wherein a servo loop model for said at least one axis and a model for at least one gearbox is run in the model-based evaluator of the position switch.

40. Use of a device according to claim 19 for operations using a multi-axis industrial robot or manipulator in an industrial or commercial installation, a place of work or an amusement ride.

41. Use of a system according to claim 32 to operate a multi-axis industrial robot or manipulator in an industrial or commercial installation to carry an operation comprising any from the list of: fitting parts to automobiles, painting, welding, soldering, riveting, gluing, folding plate, bending plate, hemming plate, fettling, cutting, laser cutting, water jet cutting, gripping an object, manipulating an object, stacking, pick and place, palletising, depalletising.

* * * * *